Sept. 10, 1929.   R. H. CHATFIELD   1,727,335
CONVERTIBLE CARRIAGE AND CRIB

Filed June 29, 1928

INVENTOR.
Ruth Hall Chatfield
BY
ATTORNEY

Patented Sept. 10, 1929.

1,727,335

UNITED STATES PATENT OFFICE.

RUTH HALL CHATFIELD, OF FREEPORT, NEW YORK.

CONVERTIBLE CARRIAGE AND CRIB.

Application filed June 29, 1928. Serial No. 289,144.

This invention relates to a new and useful device in the nature of a convertible baby carriage and automobile crib especially adapted for use by infants.

The object of the invention is to provide a baby carriage adapted for wheeling infants on the street readily converted into a crib when the wheels of the device are hinged upwardly, in a non-extended position, so as to permit the device to be placed in an automobile to function or serve as a crib for the infant.

A further object of the invention is to provide a device of the class described which does not necessitate the disturbing of the infant placed therein when the device is placed in or removed from an automobile.

Another object of the invention is to provide a device of the class described which will protect the infant placed therein from drafts and the like especially while the device is in an automobile, and which will provide adequate comfort and insure rest for the infant.

A still further object of the invention is to provide a device of the class described, of novel construction and arrangement of parts hereinafter more fully described, claimed and illustrated in the accompanying drawing.

Figure 1:
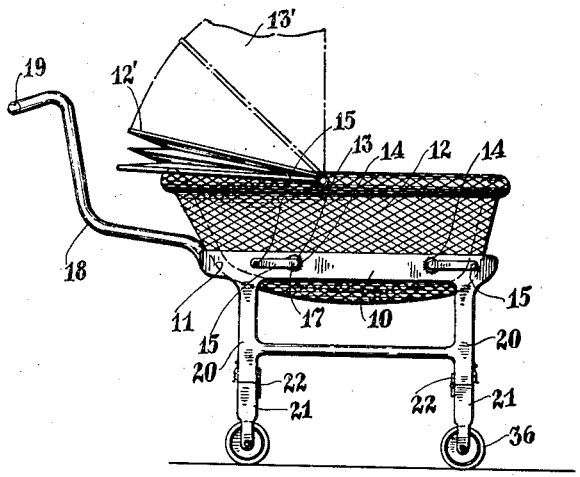
Fig. 1 is a side elevational view of my improved device as same would appear when in use as a carriage.

As here embodied my improved device comprises a frame work consisting of a main portion 10 of oval or elongated ring shape construction, horizontally disposed and having its inner edge 11 somewhat tapered or downwardly converging, adapted to receive the basket 12, carriage proper, which partially engages in the said main portion. The basket 12 is of hollow shell like construction open at the top thereof, so as to permit an infant to be placed therein. The usual folding hood 12' is secured to the basket 12 and may be extended or opened as at 13' so as to afford protection to the infant placed therein, eliminating the lowering of the curtains of the automobile which interfere with operation of the automobile in traffic.

Pins 13 are provided with enlarged heads 14, and slidably engage in apertures formed in the main portion 10 of the framework. Springs 15 are secured at one extremity thereof as at 16 to the main portion 10 of the framework and are provided with free extremities 17, which contact over the enlarged heads 14 of the pins 13, urging the said pins 13 into apertures formed in the basket 12, as a means of securely and removably holding the said basket 12 in place in the main portion 10 of the framework.

The framework is provided with rear extended elements 18 formed or bent upwardly, disposed in parallel relation and provided with a cross member 19 horizontally disposed as the extended extremities of the said elements 18. The latter described construction is such as will provide a suitable and convenient hand member for the purpose of pushing my improved device along the street, also as a means for providing a steadiness to the crib when the car is in motion.

Leg elements 20 are extended downwardly from the main portion 10 of the framework and are positioned in proximity to the front and rear of the said main portion, as a means of providing the usual four legs such as is the general construction in baby carriages and the like.

Lower leg members 21 are hinged as at 22, at their upper extremities to the lower extended extremities of the leg elements 20. The lower leg members 21 are of hollow tubular construction, and have slidably mounted therein engaging members 23, of cylindrical block like construction. Pins 24 are secured to the engaging members 23 and extend outwardly therefrom through elongated openings 25 formed in the lower leg members 21, and are provided with enlarged heads 26. The main portions of the elongated openings 25 are longitudinally disposed relative to the lower leg members, and are provided with transverse side extended openings 27 and 28, positioned at the top and bottom respectively of the main portions of the said elongated openings.

Figure 3:
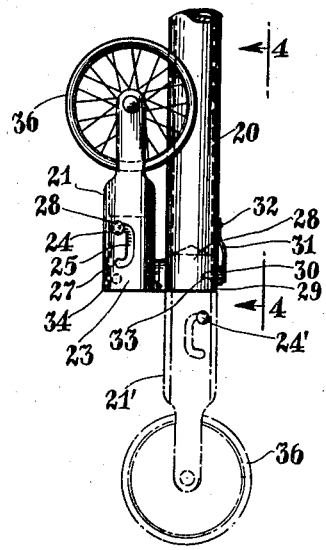
Fig. 3 is an enlarged fragmentary side elevational view of the folding wheel as embodied in my improved device.
Figure 2:
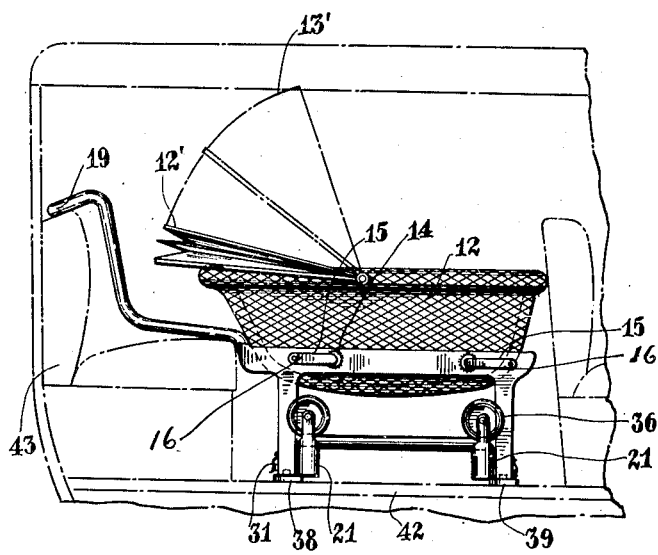
Fig. 2 is a similar view showing my improved device in use in an automobile as a crib.

The above described construction is such as will permit the said engaging members to be securely held in concealment in the said lower leg members, as clearly shown in Fig. 3, and also such as will permit the said engaging members 23 to be securely held in a partially extended position, slidably engaged in the lower portions of the above mentioned leg elements as designated by the reference numeral 28, when the pins 24 are positioned in the upper extended portions 28 of the elongated openings 25. The said lower leg members 21 are positioned in an extended position relative to the said leg elements 20, as designated by the reference numeral 21'.

Pins 29 slidably engage in apertures formed in the said leg elements and are provided with enlarged heads 30. Springs 31 are secured at one extremity as at 32 to the leg elements 21 and contact over the enlarged heads 30 of the pins as a means of holding the pointed extremities 33 of the pins 29 in engagement in openings 34 formed in the engagement members 23 as a means of securely holding the lower leg members in a downwardly extended position relative to the leg elements 21.

Figure 4:
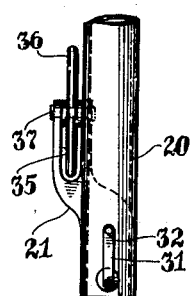
Fig. 4 is a front elevational view thereof.
Figure 5:
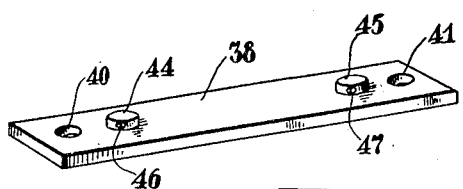
Fig. 5 is a perspective view of the mounting plates as used in combination with my improved device.

The lower leg members 21 have formed therein, at their lower extended extremities elongated slots 35, adapted to freely receive the wheels 36 rotatively mounted on the shafts 37 or axles carried in the lower extended portions of the said leg members, which are formed or bent somewhat offset, outwardly from the leg elements 20, as clearly shown in Fig. 4, the said offsetting permitting the said wheels 36 to clear the leg elements 20 which allow the said lower leg members 21 to be hinged vertically upwardly approximately parallel to the said leg elements. The said offsetting also affords a more stable carriage when the leg members are in an extended position.

A pair of mounting plates 38 and 39 of rectangular construction have formed therein apertures 40 and 41 adapted to receive screws, bolts, studs or the like as a means of attaching the said mounting plates to the floor 42 of an automobile directly in front of the seat 43 of the automobile. A pair of engaging members 44 and 45 are secured to the plate members 38 and 39 and have formed therein apertures 46 and 47 adapted to receive the pointed extremities 33 of the pin 29 as a means of removably holding my improved device in place in an automobile in front of the seat 43 of the said automobile.

It is to be understood that my improved device may be equipped with a suitable hand or foot operated brake, or any of the usual, conventional accessories such as ordinarily used on baby carriages.

It is also to be understood that my improved device may be adapted for use on any type of automobile, whether it is of the coupé, roadster or sedan type and that the proportions may be so altered as to be readily adaptable to all vehicles.

Having thus described my invention what I claim as new and desire to secure by United States Letters Patent is:

1. In a convertible carriage and crib, leg elements extended downwards from the main portion of a framework for supporting a basket, and formed with opened lower ends, hollow lower leg members hingedly connected at their top ends on the lower ends of the said leg elements, engaging members slidably mounted within the lower leg members and extendible to engage within the opened lower ends of the leg elements for holding the leg members in longitudinal aligned positions.

2. In a convertible carriage and crib, leg elements extended downwards from the main portion of a framework for supporting a basket, and formed with opened lower ends, hollow lower leg members hingedly connected at their top ends on the lower ends of the said leg elements, engaging members slidably mounted within the lower leg members and extendible to engage within the opened lower ends of the leg elements for holding the leg members in longitudinal aligned positions, and means for holding the engaging members in extended or retracted positions.

3. In a convertible carriage and crib, leg elements extended downwards from the main portion of a framework for supporting a basket, and formed with opened lower ends, hollow lower leg members hingedly connected at their top ends on the lower ends of the said leg elements, engaging members slidably mounted within the lower leg members and extendible to engage within the opened lower ends of the leg elements for holding the leg members in longitudinal aligned positions, and means for holding the engaging members in extended or retracted positions, said means including pins projecting from the engaging members into slots formed in the lower leg members, said slots having longitudinal portions and transverse end portions.

In testimony whereof I have affixed my signature.

RUTH HALL CHATFIELD.